(12) United States Patent
Hill (10) Patent No.: US 7,219,925 B2
(45) Date of Patent: May 22, 2007

(54) ROLL-CAGE ASSEMBLY AND A MOTOR VEHICLE INCORPORATING SAME

(75) Inventor: Christopher Stephen Hill, Stockton (GB)

(73) Assignee: Ford Global Technologies, LLC, Dearborn, MI (US)

( * ) Notice: Subject to any disclaimer, the term of this patent is extended or adjusted under 35 U.S.C. 154(b) by 280 days.

(21) Appl. No.: 10/472,336

(22) PCT Filed: Mar. 4, 2002

(86) PCT No.: PCT/GB02/00927

§ 371 (c)(1), (2), (4) Date: Sep. 22, 2003

(87) PCT Pub. No.: WO02/074586

PCT Pub. Date: Sep. 26, 2002

(65) Prior Publication Data
US 2005/0258626 A1 Nov. 24, 2005

(30) Foreign Application Priority Data
Mar. 19, 2001 (GB) .................................. 0106706.5

(51) Int. Cl.
*B60R 21/16* (2006.01)
*B60R 21/20* (2006.01)
*B60R 21/13* (2006.01)

(52) U.S. Cl. ................. 280/756; 280/730.1; 280/730.2
(58) Field of Classification Search ................ 296/210, 296/225; 280/756, 730.1, 728.1, 730.2
See application file for complete search history.

(56) References Cited

U.S. PATENT DOCUMENTS

| 3,804,435 | A | * | 4/1974 | See et al. ................... 280/733 |
| 6,106,006 | A | * | 8/2000 | Bowers et al. ............ 280/730.2 |
| 6,170,861 | B1 | * | 1/2001 | Tietze ...................... 280/730.2 |
| 6,189,962 | B1 | * | 2/2001 | Henderson .................. 296/218 |
| 6,237,941 | B1 | * | 5/2001 | Bailey et al. ............. 280/730.2 |
| 6,340,171 | B1 | * | 1/2002 | Hirth et al. ............... 280/730.2 |

FOREIGN PATENT DOCUMENTS

| DE | 9416772 | 7/1995 |
| JP | 11209086 | 3/1999 |

* cited by examiner

Primary Examiner—Ruth Ilan
(74) Attorney, Agent, or Firm—Gary A. Smith (57) ABSTRACT

A roll-cage assembly for fitting to a motor vehicle, particularly one of the type having no fixed roof structure. The assembly has a space-frame structure constructed from a number of tubular members joined together and at least one airbag assembly that is attached to one or more of the tubular members. The airbag assembly performs two functions: during normal use it provides a relatively soft covering for the tubular member to which it is fastened; and in the event of an accident an airbag is released to provide full head impact protection.

4 Claims, 6 Drawing Sheets

ROLL-CAGE ASSEMBLY AND A MOTOR VEHICLE INCORPORATING SAME

FIELD OF THE INVENTION

This invention relates to a roll-cage assembly and in particular to roll-cage assembly having improved head impact properties for a motor vehicle.

BACKGROUND

It is well known for example from GB-A-2,306,408 to provide a roll-cage assembly for a motor vehicle.

Such an assembly is often used to strengthen the upper body structure of a motor vehicle and particularly when the motor vehicle has no significant body structure above a waist level of the motor vehicle. Such vehicles include convertible motor vehicles, tractors and recreational vehicles such as those manufactured by Land-Rover™.

It is a problem with such prior art roll-cage assemblies that the roll-cage is manufactured from rigid tubular components that are not particularly occupant friendly in the event of contact between a body part of the occupant and a structural part of the roll-cage.

It is well known for example from WO-A-01/92068 to provide an inflatable rollover cushion for use in a motor vehicle to prevent the head and torso of an occupant of a motor vehicle with a roof from striking a side window or going out through an open side window in the event of a side impact.

Such an airbag assembly cannot be used in a recreational vehicle of the type having no permanent roof structure because is designed to be concealed behind a roof liner which is not present in this type of vehicle.

SUMMARY OF THE INVENTION

It is an object of the invention to provide a roll-cage assembly that is suitable for use in a vehicle having no fixed roof and which provides improved head impact protection at all times but in particular in the event of an impact of the motor vehicle with another object.

According to a first aspect of the invention there is provided roll-cage assembly for a motor vehicle, the assembly comprising a space-frame structure constructed from a number of interconnected tubular members and at least one airbag assembly fastened to one or more of the tubular members.

Preferably, a part of the at least one airbag assembly may form an impact absorbing member partially covering the respective tubular member to which it is fastened in the region where impact between a passenger's head and the tubular member is likely to occur.

The airbag assembly may comprise of at least one airbag and a housing for accommodating the at least one airbag, the housing having one or more weakened portions to assist the at least one airbag to break through the housing when it is deployed.

Advantageously, the portion of the tubular member not covered by the at least one airbag assembly may be covered with an impact absorbing foam material.

The space frame structure may comprise of two roof rails each of which, in use, extends longitudinally along one side of a passenger compartment of the motor vehicle and at least four downwardly extending support posts to connect the roof rails to the structure of the motor vehicle and at least one cross-rail which, in use, extends transversely across the motor vehicle to interconnect the two roof rails wherein each of the roof rails has at least one airbag assembly fastened thereto.

In accordance with an embodiment of the invention, the space frame structure may comprise two roof rails each of which, in use, extends longitudinally along one side of a passenger compartment of the motor vehicle and a number of support posts to connect, in use, the roof rails to the structure of the motor vehicle, wherein there is one airbag assembly fastened to each roof rail the airbag assembly having two or more airbags and a housing for accommodating the airbags, one of the airbags being located such that, when deployed, it is positioned so as to provide protection for a front seated passenger and at least one of the remaining airbags being located such that, when deployed, it is positioned so as to provide protection for a rear seated passenger.

In which case, the non-inflatable portion may be routed around an inwardly facing surface of the central post.

The airbag housing may include a number of integral fixing means forming part of a snap fixing used to connect the housing to the respective tubular member.

Each integral fixing means may be a barb shaped prong for co-operation with an aperture formed in the respective tubular member to provide said snap fixing.

According to a second aspect of the invention there is provided a motor vehicle including a roll-cage assembly in accordance with the first aspect of the invention.

BRIEF DESCRIPTION OF THE DRAWINGS

The invention will now be described by way of example with reference to the accompanying drawing of which.

DETAILED DESCRIPTION OF THE PREFERRED EMBODIMENTS

Figure 1:
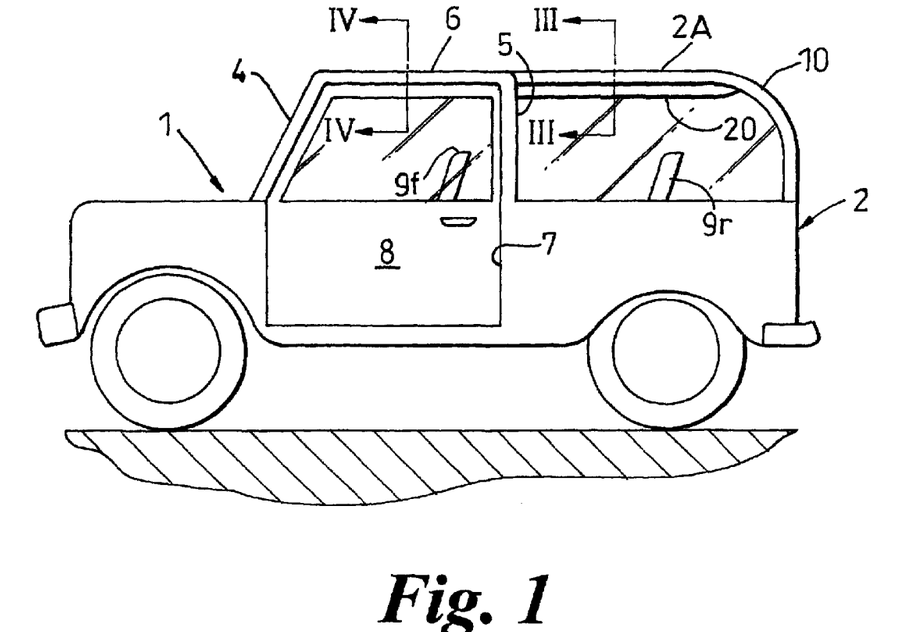
FIG. 1 is a side view of a recreational motor vehicle according to a second aspect of the invention showing a first embodiment of a roll-cage assembly according to a first aspect of the invention.
Figure 2:
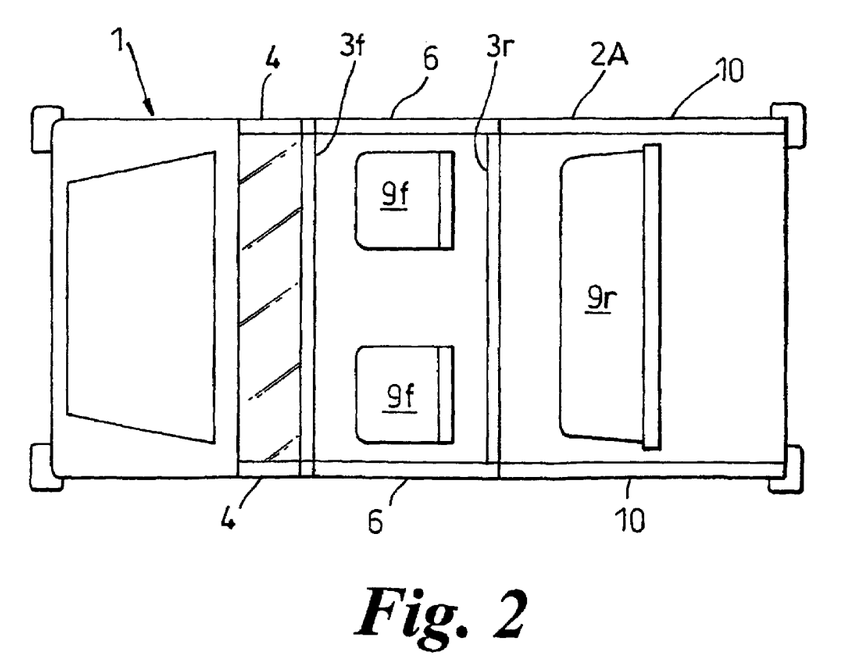
FIG. 2 is a plan view of the motor vehicle shown in FIG. 1.
Figure 3:
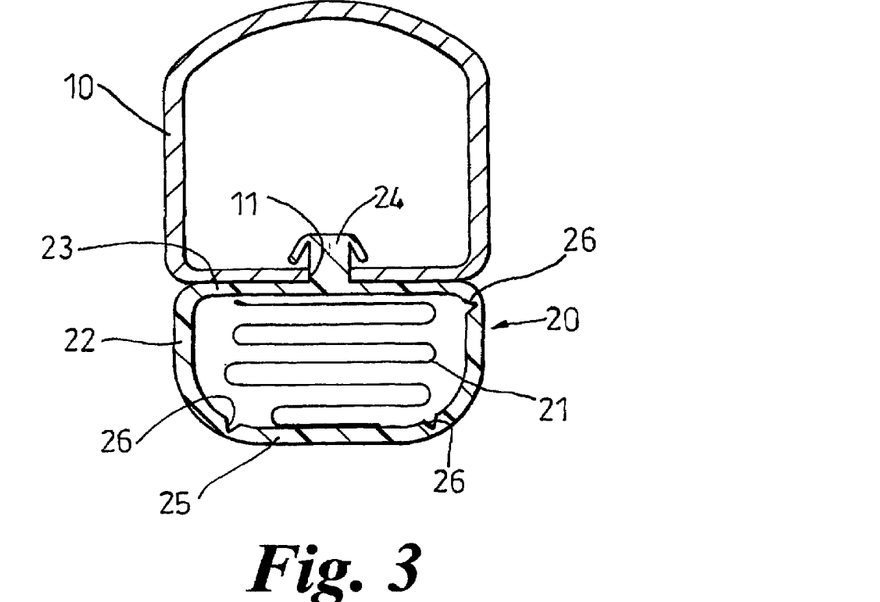
FIG. 3 is a cross-section on the line III—III on FIG. 1 showing a first embodiment of an airbag assembly according to a first aspect of the invention.

With particular reference to FIGS. 1 to 3 there is shown a motor vehicle 1 in the form of a recreational vehicle such as the Defender™ vehicle manufactured by Land Rover™ and the Wrangler™ vehicle manufactured by Jeep™ both of which are available in variants having no fixed roof.

The motor vehicle 1 has a lower body structure 2 to which is fastened a roll-cage assembly 2A.

The body structure 2 defines on each side of the vehicle 1 a door aperture 7 in which is mounted a door 8 to assist with egress from and ingress into the vehicle 1.

Front and rear seats 9f and 9r are fitted into a passenger compartment of the motor vehicle for use by front and rear passengers of the motor vehicle 1.

The roll-cage assembly 2A forms a space-frame and is constructed from a number of interconnected tubular members, there being two cross-rails 3f, 3r, two "A" or front support posts 4, two "B" or central support posts 5, two front side rails 6 and two rear side rails in the form of longitudinally extending rollover bars 10 to provide protection to passengers seated on the rear seat 9r.

The front and rear side rails 6 and 10 on each side of the space-frame form a longitudinally extending roof rail which in use extends longitudinally along one side of a passenger compartment of the motor vehicle 1.

The roll-cage assembly 2A has two front posts 4, two central posts 5 and two rear posts to connect the roof rails to the structure of the motor vehicle. Each of the roof rails comprises of a front portion in the form of the front side rail 6 between the respective front and central posts 4 and 5 on that side of the roll-cage assembly 2A and a rear portion in the form of the rollover bar 10 between respective central and rear posts on that side of the roll-cage assembly 2A.

Although the roof rails as described herein are constructed from two separate members 6, 10 which are joined together it will be appreciated that each roof rail could be a single member extending along the length of the passenger compartment.

Each of the rollover bars 10 is fastened at one end to the respective "B" post on that side of the vehicle 1 and at its other end is turned downwardly to form a rear support post that is connected to part of the general lower body structure 2 of the vehicle 1.

As shown the roof is totally absent but in practice a two-part roof is used for the vehicle. A reinforced plastic or lightweight metal panel is secured to the side rails 6 and cross rails 3f, 3r to protect the front seat occupants and a flexible waterproof covering is attachable to the roll-over bars 10 to protect the rear seated passengers.

In some cases a removable hardtop made from plastics or lightweight material is also supplied for use when the weather is particularly severe or as a replacement for the fabric covering. The hard top could cover only the front passenger or could extend over both the front and rear passengers. Such soft-top and hard top assemblies are well known in the art and will not be further described herein.

In either case no permanent roof lining is fitted to the vehicle in the region of the side rails 6 or the roll-over bars 10.

As best seen in FIG. 3 each of the rollover bars 10 is made from a length of tubular material, which in the case of the preferred embodiment is steel but could also be other materials such as aluminium alloy or magnesium alloy or a fibre reinforced composite material.

A number of apertures 11 are formed in each rollover bar for use in securing an airbag assembly 20 to the rollover bar 10 as will be described hereinafter.

The airbag assembly 20 comprises an elongate airbag 21, a gas generator (not shown) and a housing 22 for accommodating the airbag 21.

The housing 22 is of a tubular construction and is made from a rigid but resilient plastics material. The housing 22 has base portion 23 having a number of integral fixing means in the form of barbed studs 24 formed as an integral part thereof and a cover portion 25. The studs 24 are spaced out along the length of the housing 22 for co-operation with the apertures 11 in the rollover bar 10 so as to form a snap fixing between the housing 22 and the rollover bar 10. Alternatively the studs 24 could be welded or adhesively attached but in either case they are permanently attached to the housing 22 and form an integral part thereof.

The cover portion 25 is less rigid than the base portion 23 and has a number of weakening grooves 26 formed on an inner surface thereof to assist with opening of the cover portion 25 when the airbag 21 has to be deployed. The outer surface of the cover portion 25 is provided with a decorative finish because it is constantly in view.

The cover portion 25 not only retains the airbag 21 within the housing 22 but also performs a secondary safety function in that its resilient construction allows it to absorb some of the force of impact if the head of a rear seated passenger should come into contact with it in a situation when the airbag 21 is not deployed. This can happen when the vehicle 1 is traversing extremely bumpy ground in an off-road situation or when the vehicle 1 runs into a pothole or depression during road use.

The cover portion 25 is relatively soft in comparison to the steel tube from which the rollover bar 10 is made and so any contact with the cover portion 25 will result in less damage to the passenger than would otherwise be the case.

To install the airbag assembly 20 into the vehicle 1 is a relatively simple and quick operation. The airbag assembly 20 is supplied as a single component from the supplier, the airbag 21 is stored within the housing 22 and the gas generator is connected to the airbag 21 by a short length of tubing. The airbag assembly 20 is easy to handle and is first positioned up against the rollover bar 10 causing the studs 24 to engage with the apertures 11. The operator then applies a small amount of pressure to the housing 22 causing the studs 24 to snap into engagement with the apertures 11.

The gas generator is then secured to the adjacent "B" post by means of a single screwed fixing and connected to an electric circuit used to control actuation of the airbag 21. Finally, a trim member is secured to the "B" post to obscure the gas generator from view.

Operation of the airbag assembly is conventional in that when deployment is required the electric circuit energizes the gas generator, which causes the airbag 21 to be inflated and break out through the weakened cover 25.

Figure 4:
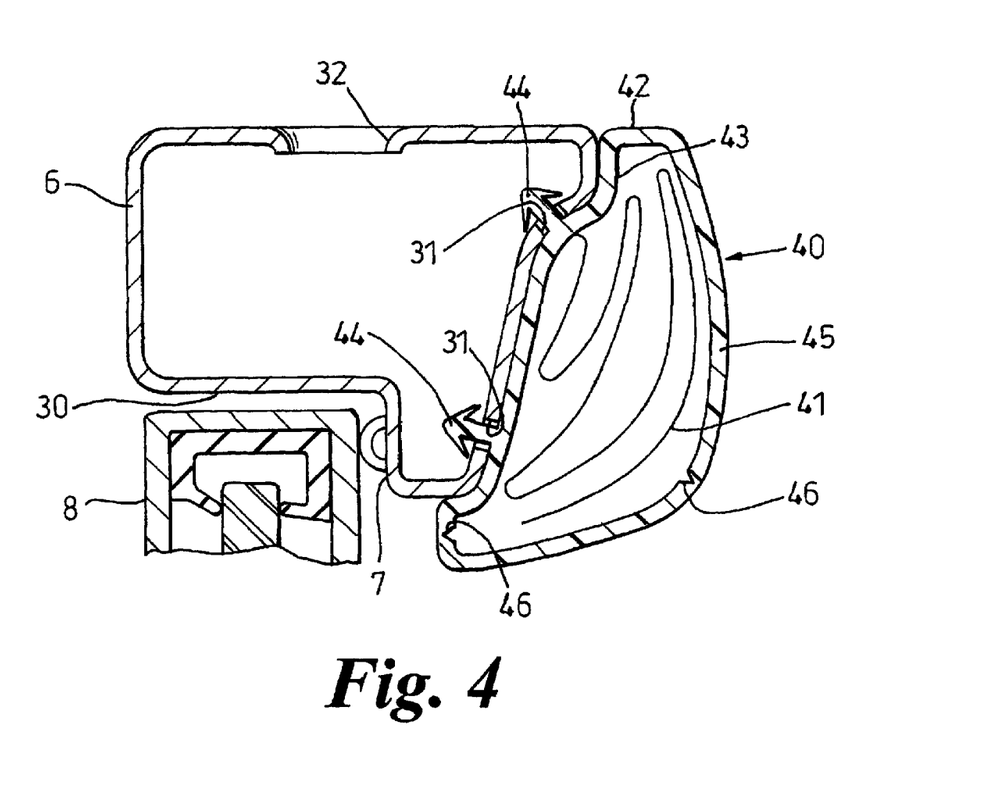
FIG. 4 is a cross-section on the line IV—IV on FIG. 1 showing a second embodiment of an airbag assembly according to the first aspect of the invention.

With particular reference to FIG. 4 there is shown a second embodiment of an airbag assembly for fitment to the roll-cage 2A. The motor vehicle 1 and its construction are the same as previously described and will not be further described except to illustrate differences or additional features.

As best seen in FIG. 4 each of the side rails 6 is a tubular box-section member and defines on an outer edge a rebate 30 form part of the door aperture 7 into which the door 8 is fitted.

A number of apertures 31 are formed in each side rail 6 for use in securing the airbag assembly 40 to the side rails 6 and further apertures 32 are provided for use in securing a removable roof panel (not shown) to the vehicle 1.

The airbag assembly 40 comprises an elongate airbag 41, a gas generator (not shown) and a housing 42 for accommodating the airbag 41.

The housing 42 is of a tubular construction and is made from a rigid but resilient plastics material and has base portion 43 and a cover portion 45.

The base portion 43 has a number of integral fixing means in the form of barbed studs 44 formed as an integral part thereof. The studs 44 are spaced out along the length of the housing 42 for co-operation with the apertures 31 in the side rails 6 so as to form a snap fixing between the housing 42 and the side rails 6.

The cover portion 45 is less rigid than the base portion 43 and has a number of weakening grooves 46 formed on an inner surface thereof to assist with opening or splitting of the cover portion 45 when the airbag 41 has to be deployed.

The cover portion 45 not only retains the airbag 41 within the housing 42 but also performs a secondary safety function in that its resilient construction allows it to absorb some of the force of impact if the head of a front seated passenger should come into contact with it in a situation when the airbag 41 is not deployed.

Because the cover portion 45 is relatively soft in comparison to the steel from which the roof rail 6 is made any contact with it will result in less damage to the passenger than would otherwise be the case.

To install the airbag assembly 40 into the vehicle 1 is a relatively simple and quick operation. The airbag assembly 40 is supplied as a single component from the supplier with the airbag 41 stored within the housing 42 and the gas generator connected to the airbag 41 by a short length of tubing.

The airbag assembly is therefore easy to handle and is first positioned up against the side rail 6 causing the studs 44 to engage with the apertures 31. The operator then applies a small amount of pressure to the housing 42 causing the studs 44 to snap into engagement with the apertures 31.

The gas generator is then secured to the adjacent "A" post by means of a single screwed fixing and is connected to an electric circuit used to control actuation of the airbag 41. Finally a trim member is secured to the "A" post to obscure the gas generator from view.

Therefore there are two airbag assemblies 20, 40 fastened to each roof rail, a first airbag assembly 40 having a housing 42 attached to the front portion 6 of the roof rail and a second airbag assembly 20 having a housing 22 attached to the rear portion 10 of the roof rail, each of the housings 40, 20 accommodates an airbag 41, 21 positioned to provide head protection at a specific position along the length of the vehicle.

The front air bag 41, when deployed, provides protection for a front seated passenger and may be shaped so as to overlie the central post. The rear airbag 21, when deployed, provides protection for a rear seated passenger and may be shaped so as to overlie the rear post.

Operation of the airbag assembly is conventional in that when deployment is required the electric circuit energizes the gas generator, causing the airbag 41 to be inflated and break out through the weakened cover 45.

Figure 5:
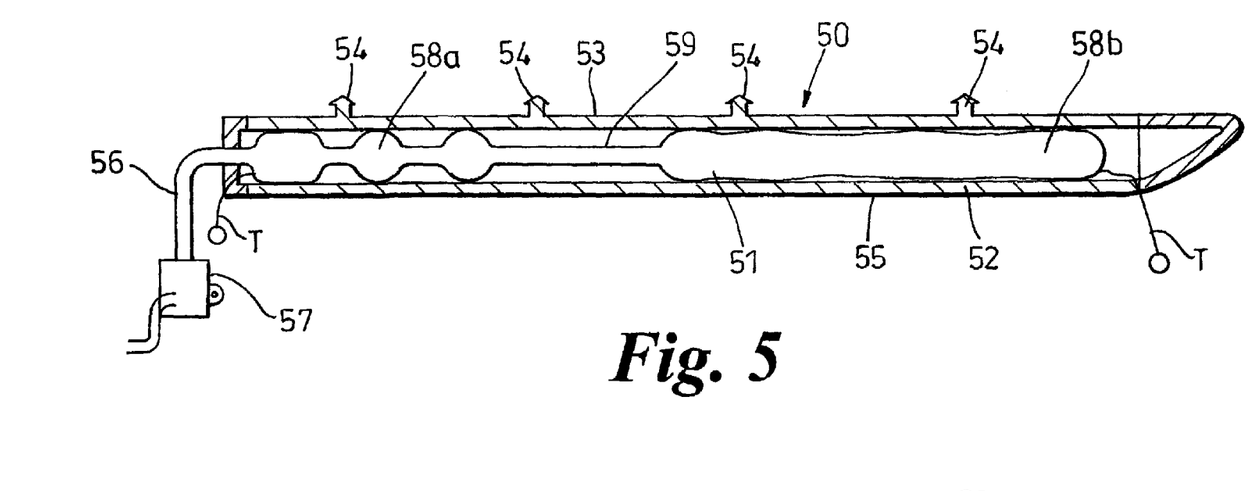
FIG. 5 is a cross-section through a third embodiment of an airbag assembly according to the first aspect of the invention.

With particular reference to FIG. 5 there is shown a third embodiment of an airbag assembly for use as part of a roll-cage assembly according to the invention.

In the previously described embodiments two separate head impact airbag assemblies are provided for the front and rear seated passengers but this need not be the case and a single airbag assembly extending along the length of the passenger compartment can be used. Such an assembly is often referred to as a side curtain airbag assembly and may include a portion that extends around an inner surface of the central support post 5.

The airbag assembly 50 comprises an elongate airbag 51, a gas generator 57 and a housing 52 for accommodating the airbag 51.

The housing 52 is of a tubular construction and is made from a rigid but resilient plastics material and has base portion 53 having a number of integral fixing means in the form of barbed studs 54 and a cover portion 55. The studs 54 are spaced out along the length of the housing 52 for co-operation with the corresponding apertures 11 in the roll-over bar 10 and the apertures 31 in the side rails 6 so as to form a snap fixing between the housing 52 and the roof rails.

The cover portion 55 is less rigid than the base portion 53 and is weakened at specific locations to assist with opening of the cover portion 55 when the airbag 51 has to be deployed. The outer surface of the cover portion 55 is provided with a decorative finish because it is constantly in view.

The cover portion 55 not only retains the airbag 51 within the housing 52 but also performs a secondary safety function in that its resilient construction allows it to absorb some of the force of impact if the head of a seated passenger should come into contact with it in a situation when the airbag 51 is not deployed.

The airbag 51 is formed with two discrete chambers 58a, 58b to provide protection for the front and rear seated passengers. The chambers 58a, 58b are linked by a pipe 59 and a pipe or conduit 56 is used to connect the airbag 51 to the gas generator 57.

Tethers or tightening bands "T" are used to connect the ends of the airbag 51 to parts of the vehicle structure 2 so as to stabilize the lower edge of the airbag 51 when it is inflated.

There is therefore one airbag assembly 50 fastened to each roof rail, the airbag assembly 50 having a single airbag 51 and a housing 52 for accommodating the airbag 51 which has front and rear interconnected chambers 58a, 58b.

The front chamber 58a is located such that, when deployed, it is positioned so as to provide protection for a front seated passenger and the rear chamber 58b is located such that, when deployed, it is positioned so as to provide protection for a rear seated passenger.

The front chamber 58a may be shaped so as to overlie the central support post when deployed and the rear chamber 58b may be shaped so as to overlie the rear support post when deployed.

To install the airbag assembly 50 into the vehicle 1 is a relatively simple and quick operation. The airbag assembly 50 is supplied as a single component from the supplier, the airbag 51 is stored within the housing 52 and the gas generator 57 hangs free from the front end of the housing 52.

The assembly 50 is first positioned up against the rollover bar 10 and side rails 6 which in combination form the roof rails causing the studs 24 to engage with the apertures 11 and 31. The operator then presses against the housing 52 causing the studs 54 to snap into engagement with the apertures 11 and 31. The gas generator 57 is then secured to the adjacent "A" post by means of a single screwed fixing and is connected to an electric circuit used to control actuation of the airbag 51.

The tethers "T" are secured to the "A" post and to the rollover bar 10. Finally, a trim member is secured to the "A" post to obscure the gas generator 57 and front tether from view.

Operation of the airbag assembly is conventional in that when deployment is required the electric circuit energizes the gas generator 57 which cause the two chambers 58a, 58b of the airbag 51 to be inflated and break out through the weakened cover 55.

Figure 6:
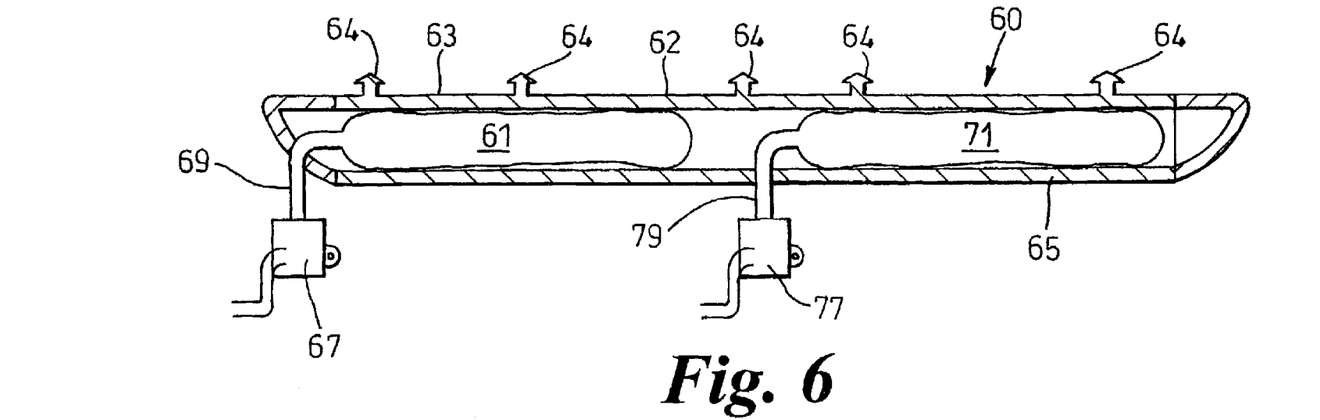
FIG. 6 is a cross-section through a fourth embodiment of an airbag assembly according to the first aspect of the invention.

With particular reference to FIG. 6 there is shown a fourth embodiment of an airbag assembly for use as part of a roll-cage assembly according to the invention.

The airbag assembly 60 comprises two elongate airbags 61, 71, two gas generators 67, 77 and a common housing 62 for accommodating the airbags 61, 71.

The housing 62 forms a receptacle for the airbags 61, 71 and is made from a rigid but resilient plastics material. The housing is constructed from a base portion 63 and a cover portion 65.

The base portion 63 has a number of integral fixing means in the form of barbed studs 64 formed as an integral part thereof for co-operation with corresponding apertures 11, 31 in the roll-over bar and side rails 6 so as to form a snap fixing between the housing 62 and the roof rails.

The cover portion 65 is weakened at specific locations corresponding to the positions of the airbags 61, 71 to assist with opening of the cover portion 55 when the airbags 61, 71 have to be deployed.

The cover portion 65 performs a secondary safety function in that its resilient construction allows it to absorb some of the force of impact if the head of a seated passenger should come into contact with it in a situation when the airbags 61, 71 are not deployed.

The airbag 61 is connected to the gas generator 67 by a pipe 69 and the airbag 71 is connected to the gas generator 77 by a pipe 79.

There is therefore one airbag assembly 60 fastened to each roof rail having two separate front and rear airbags 61, 71 and a housing 62 for accommodating the airbags 61, 71. The front airbag 61 is located such that, when deployed, it is positioned so as to provide protection for a front seated passenger and the rear airbag 71 being located such that, when deployed, it is positioned so as to provide protection for a rear seated passenger.

The front airbag 61 may be shaped so as to overlie the central support post when deployed and the rear airbag 71 may be shaped so as to overlie the rear support post when deployed.

To install the airbag assembly 60 into the vehicle 1 is a relatively simple and quick operation.

The airbag assembly 60 is supplied as a single component from the supplier with the airbags 61 and 71 stored within the housing 62 and the gas generators 67, 77 hanging freely from the housing 62.

The assembly 60 is first positioned up against the rollover bar 10 and roof rails 6 causing the studs 24 to engage with the apertures 11 and 31. The operator then applies a small amount of pressure to the housing 62 causing the studs 64 to snap into engagement with the apertures 11 and 31.

The gas generators 67, 77 are then secured to the adjacent "A" and "B" posts and are connected to respective electric circuits used to control actuation of the airbags 61, 71.

Respective trim members are then secured to the "A" and "B" posts to obscure the gas generators 67, 77 from view.

Operation of the airbag assembly 60 is conventional in that when deployment is required the electric circuits energizes the gas generators 67, 77 which cause the two airbags 61, 71 to be inflated and break out through the weakened cover 65.

It will be appreciated that the housing for the airbag or airbags could be formed as a single tubular component or could be formed by more than one component for example the base portion could be moulded as an integral component including the studs from one plastics material and the cover portion could be moulded from a different plastics material. The two parts could then be joined together along their respective longitudinal edges by welding, bonding or by interengaging mechanical connections.

The invention is not limited to the use of snap fastening for the attachment of the housing to the vehicle other fastening means such as but not limited to threaded fastening means and rivets could be used.

In addition the gas generator f at least one airbag could be located in various positions such as the front cross rail, A post, B post, C post or within the housing itself.

With particular reference to FIGS. 7 to 12 there is shown a second embodiment of a roll-cage assembly for fitment to a motor vehicle and in particular to a recreational vehicle such as the Defender™ vehicle manufactured by Land Rover™ and the Wrangler™ vehicle manufactured by Jeep™ both of which are available in variants having no fixed roof.

Figure 7:
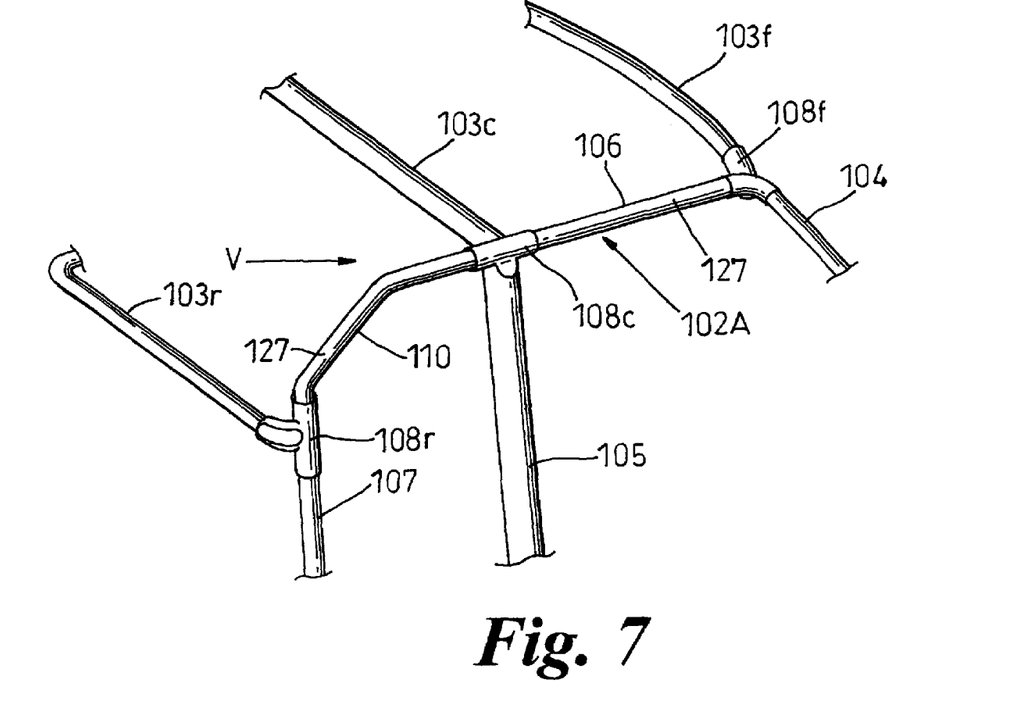
FIG. 7 is a pictorial view of the right hand side of a second embodiment of a roll-cage assembly according to the first aspect of the invention.

The roll-cage assembly 102A forms a space-frame and is constructed from a number of interconnected tubular members. The space-frame comprises of three cross-rails 103f, 103c and 103r, two front or "A" support posts 104, two central or "B" support posts 105 and two rear or "C" support posts 107, two front side rails 106 and two rear side rails 110 to provide protection to passengers seated on a rear seat of the motor vehicle. The front and rear side rails 106 and 110 on each side of the space-frame form a longitudinally extending roof rail which in use extends longitudinally along one side of a passenger compartment of the motor vehicle to which the roll-cage assembly 2A is fitted.

It will be appreciated that each roof rail could be made from a single tubular member extending along the side of the roll-cage assembly.

Each of the support posts 104, 105 and 107 extends downwardly from the side rail or rails to which it is connected and is adapted at a lower end (not shown) for attachment to the body structure of the motor vehicle to which the roll-cage assembly 2A is fitted.

Each of the front support posts 104 is connected to the front cross rail 103f and to the respective front side rail 106 by a connector 108f.

Each of the front side rails 106 is connected to the respective rear side rail 110 and to the respective central support post 105 and the central cross rail 103c by a connector 108c.

Each of the rear side rails 110 is connected to the respective rear support post 107 and to the rear cross rail 103r by a connector 108r.

The connectors 108f, 108c, and 108r can be fastened to the tubular members that they interconnect by any convenient joining method such a welding, brazing, adhesive bonding or riveting.

When the tubular members 103f, 103c, 103r, 104, 106, 105, 110 and 107 are all fastened together they form a rigid space-frame structure.

Figure 8:
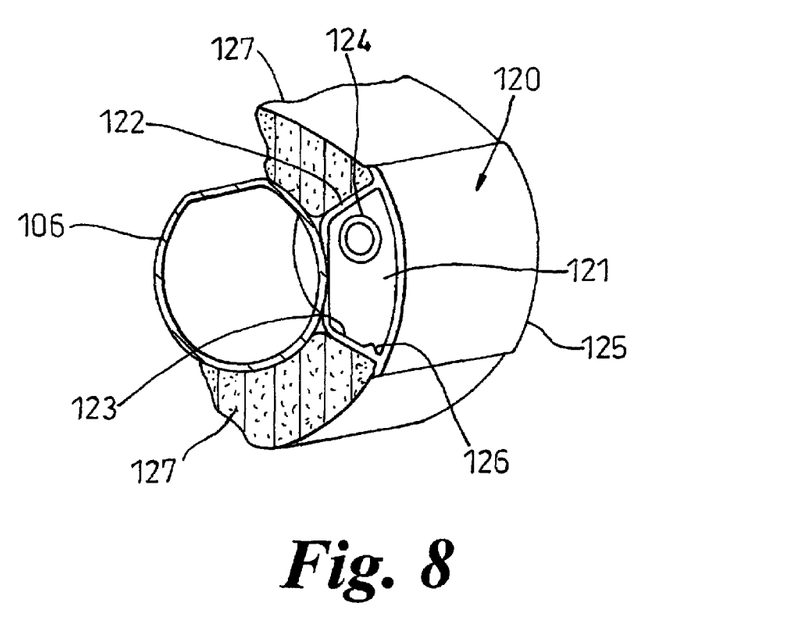
FIG. 8 is a scrap cross section through a left hand side rail and airbag assembly forming part of the roll-cage assembly shown in FIG. 7.

As best seen in FIG. 8 each of the front and rear side rails 106 and 110 is made from a length of tubular material, which in the case of the preferred embodiment is steel but could also be other materials such as aluminium alloy or magnesium alloy or a fibre reinforced composite material.

A number of apertures (not shown) are formed in each of the side rails 106 and rollover bars 110 for use in securing an airbag assembly 120 to the side rails 106 and 110 as will be described hereinafter.

Each airbag assembly 120 comprises a single elongate airbag 121 and one or more housings 122 for accommodating the airbag 121.

Each housing 122 is of a tubular construction and is made from a rigid but resilient plastics material. The housing 122 has base portion 123 and a cover portion 125.

A supply tube 124 extends along the length of the airbag 120 to supply gas from the gas generator 128 when the airbag 121 is to be deployed. The supply tube 124 has a number of apertures (not shown) spaced along its length to allow gas to escape from the tube 124 and inflate the airbag 121.

The cover portion 125 is less rigid than the base portion 123 and there is a weakening groove 126 formed on an inner surface of the housing 120 at the juncture of the cover portion 125 with the base portion 123 to assist with opening of the cover portion 125 when the airbag 121 has to be deployed.

The cover portion 125 folds upwardly when the airbag 121 is inflated so as to allow the airbag 121 to be deployed downwardly and inwardly. The juncture of the cover 125 with the base portion 123 along the upper edge of the housing 122 forms a plastic hinge to facilitate this action.

The outer surface of the cover portion 125 is provided with a decorative finish because it is constantly in view.

The cover portion 125 not only retains the airbag 121 within the housing 122 but also performs a secondary safety function in that its resilient construction allows it to absorb some of the force of impact if the head of a passenger should come into contact with it in a situation when the airbag 121 is not deployed. This can happen when the vehicle is traversing extremely bumpy ground in an off-road situation or when the vehicle runs into a pothole or depression during road use.

The cover portion 125 is relatively soft in comparison to the steel tube from which the side rails 106 and 110 are made and so any contact with the cover portion 125 will result in less damage to the passenger than would otherwise be the case.

To further improve the passive safety of the roll-cage assembly 102A the portion of each tubular member 106, 110 not covered by an airbag assembly is covered with an impact absorbing foam material 127.

If required all of the tubular members can be covered with energy absorbing foam irrespective of whether an airbag assembly is or is not fastened thereto.

Figure 9:
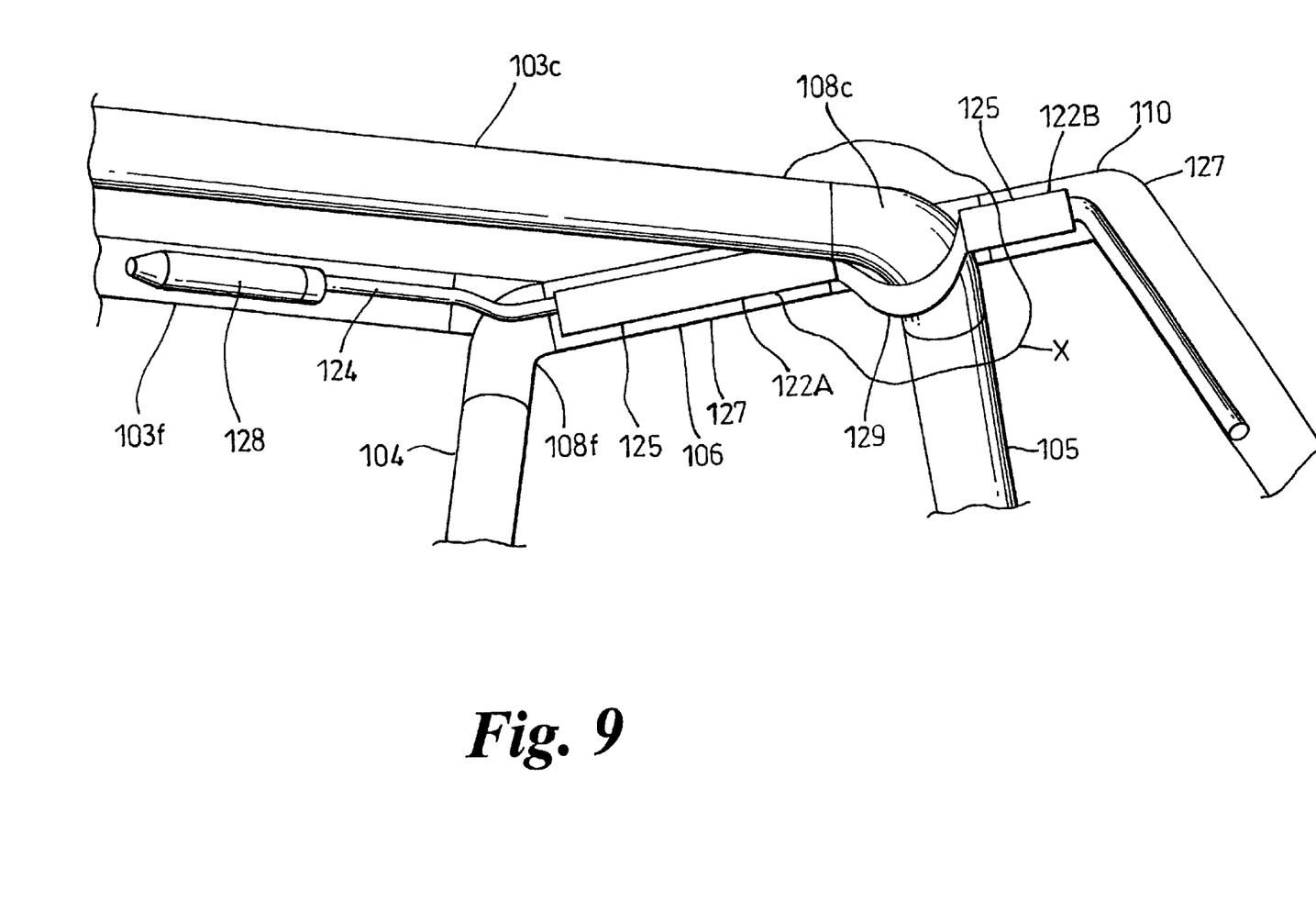
FIG. 9 is a pictorial view in the direction of arrow V on FIG. 7 showing part of the roll-cage.
Figure 10:
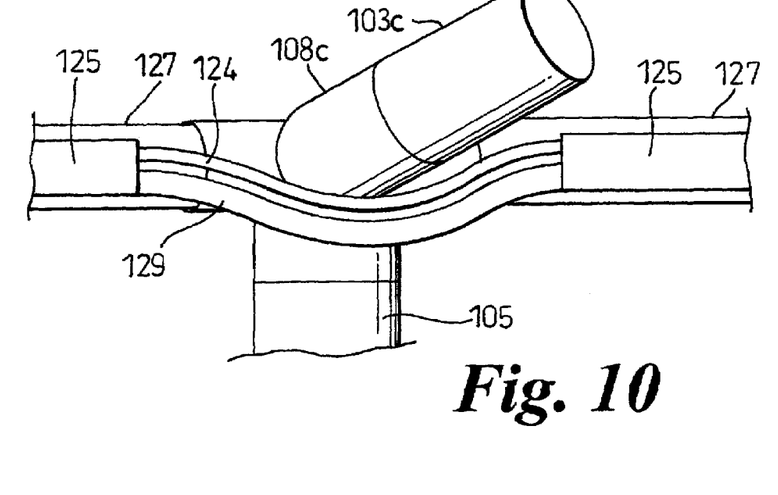
FIG. 10 is an enlarged side view of the region X shown on FIG. 9

With particular reference to FIGS. 9 and 10 it can be seen that the gas generator 128 is fastened to the front cross rail 103*f* and that the housing 122 is formed as two separate front and rear housings 122A, 122B. The two housings 122A, 122B collectively house the airbag 121.

The front housing 122A is fastened to the front side rail 106 and hence is located between the central support post 105 and the front support post 104 and the rear housing 122B is fastened to the rear side rail 110 and hence is located between the central support post 105 and the rear support post 107.

Each of the front and rear housings 122A, 122B has a flexible cover 125 and accommodates one of two chambers 121*f* and 121*r* formed in the airbag 121. The chambers 121*f*, 121*r* are located so as to provide head protection at specific positions along the length of the vehicle. The two chambers 121*f*, 121*r* are positioned such that when the airbag 121 is deployed a front chamber 121*f* is located such that it is positioned so as to provide protection for a front seated passenger and a rear chamber 121*r* is located such that, when deployed, it is positioned so as to provide protection for a rear seated passenger.

The front chamber 121*f* may be shaped so as to overlie the central support post when deployed and the rear chamber 121*r* may be shaped so as to overlie the rear support post when deployed or there may be a further chamber 130 to overlie the rear support post.

The two chambers 121*f* and 121*r* are joined together by two non-inflatable portions 129 of the airbag 121 which are routed around an inwardly facing surface of the central support post 105. The non-inflating portions tie the two chambers 121*f* and 121*r* together and allow the airbag 121 to be tethered only at its ends.

Figure 11:
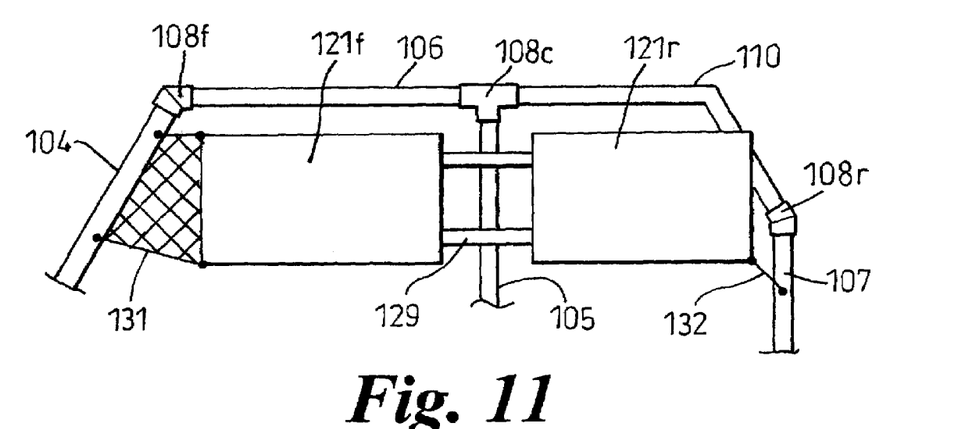
FIG. 11 is a schematic view of a first airbag arrangement forming part of the second embodiment of a roll-cage showing the airbag in a deployed state.

In the event of a serious accident or collision the gas generator 128 will be activated and gas is supplied via the supply tube 124 to the two chambers 121*f* and 121*r* thereby causing them to inflate and break out of the housing 120 into a deployed state as shown in FIG. 11.

As is shown in FIG. 11 the airbag 121 in its deployed state is tethered at its front edge to the front support post 104 by a fabric or mesh tether 131 and at its rear edge to the rear support post 107 by a single tether 132.

Figure 12:
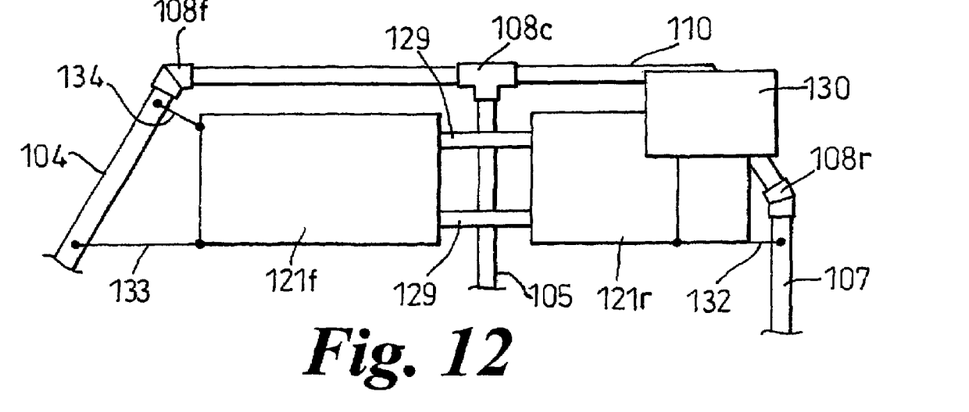
FIG. 12 is a schematic view of a second airbag arrangement forming part of the second embodiment of a roll-cage showing the airbag in a deployed state.

In a first modification to the embodiment shown in FIG. 11 the airbag 121 includes a third chamber 130 which provides more specific head protection and is arranged to be deployed so as to overlie the rear portion of the rear chamber 121*r* of the airbag 121. The third chamber 130 is connected to the gas generator 128 by the same supply tube as the other two chambers 121*f*, 121*r* and will be deployed at the same time.

In addition, instead of a fabric front tether two separate tethers 133 and 134 are employed in this embodiment.

It will be appreciated that a single housing could be used to house the airbag, in which case the housing would be fastened to both the front and the rear side rails.

It will be appreciated that each airbag could have a number of chambers such that in use each chamber is located at a specific location along the length of the vehicle to provide head protection at that location.

It will be further appreciated that instead of a single airbag 121 there could be two or more separate airbags each supplied by its own gas generator. In which case there could be one or more airbags stored in the front housing 122A and one or more airbags stored in the rear housing 122B.

It will appreciated that any robust method of fastening can be used to attach the at least one housing to the space-frame structure although snap fastening is preferred because of its ease of use.

Although the invention has been primarily described with reference to only one side of the roll-cage assembly it will be appreciated that both sides of the roll-cage assembly are fitted with one or more airbag assemblies.

In addition, although only the fitment of an airbag assembly to one or more of the side rails is described in detail it will appreciated that the invention includes the fitment of an airbag assembly alternatively or in addition to any of the other tubular members forming the space-frame and in particular to any of the cross rails.

The invention claimed is:

1. A motor vehicle having a body structure and a roll-cage assembly which together define a passenger compartment, the roll-cage assembly comprising two roof rails each of which extends longitudinally along a respective side of the passenger compartment and a number of support posts connecting the roof rails to the body structure, and at least one airbag assembly comprising a housing fastened to one of the roof rails and having two or more airbags, at least one of the airbags being located such that, when deployed, it provides protection for a front seated passenger and at least one of the remaining airbags being located such that, when deployed, it provides protection for a rear seated passenger, said at lest one housing having at least one weakened portion arranged so that, when it is deployed, the respective airbag can break through the housing at the weakened portion.

2. The motor vehicle of claim 1 in which part of the at least one airbag assembly forms an impact absorbing member partially covering the respective tubular member to which it is fastened in a region where impact between a passenger's head and the tubular member is likely to occur.

3. A roll-cage assembly attachable to a body structure of a motor vehicle such that the roll-cage assembly and the body structure together define a passenger compartment, the roll-cage assembly comprising two roof rails each of which extends longitudinally along a respective side of the passenger compartment and a number of support posts connecting the roof rails to the body structure, and at least one airbag assembly comprising a housing fastened to one of the roof rails and having two or more airbags, at least one of the airbags being located such that, when deployed, it provides protection for a front seated passenger and at least one of the remaining airbags being located such that, when deployed, it provides protection for a rear seated passenger, said at lest one housing having at least one weakened portion arranged so that, when it is deployed, the respective airbag can break through the housing at the weakened portion.

4. The roll cage assembly of claim 3 in which part of the at least one airbag assembly forms an impact absorbing member partially covering the respective tubular member to which it is fastened in a region where impact between a passenger's head and the tubular member is likely to occur.

* * * * *